United States Patent [19]
Bergeleen

[11] Patent Number: 6,076,607
[45] Date of Patent: Jun. 20, 2000

[54] HORSESHOE HAVING ADJUSTABLE FLEXIBILITY

[76] Inventor: Lyle E (Bergy) Bergeleen, 6429 Naltamont St., Spokane, Wash. 99217

[21] Appl. No.: 09/149,263

[22] Filed: Sep. 8, 1998

[51] Int. Cl.[7] .................................. A01L 1/04; A01L 5/00
[52] U.S. Cl. ..................................... 168/4; 168/6; 168/22; 168/DIG. 1
[58] Field of Search ................................ 168/4, 6, 7, 22, 168/DIG. 1

[56] References Cited

U.S. PATENT DOCUMENTS

| | | | |
|---|---|---|---|
| 374,293 | 12/1887 | Curtin | 168/7 |
| 1,211,454 | 1/1917 | Koser | 168/7 |
| 1,716,410 | 6/1929 | Austermann | 168/7 |
| 3,967,683 | 7/1976 | Ensinozo | 168/4 |
| 4,580,637 | 4/1986 | King | 168/DIG. 1 X |

Primary Examiner—Robert P. Swiatek
Attorney, Agent, or Firm—David S. Thompson

[57] ABSTRACT

A horseshoe having adjustable flexibility 100 provides a body formed of left and right body portions 200, 300. In a preferred embodiment, forward ends of the body portions are connected by one of three or more alternative center pieces, each resulting in greater or lesser flexibility of the overall horseshoe. A rigid center piece 400 provides very little flexibility; a composite center piece 500 provides a greater degree of flexibility; and a flexible center piece 600 provides the greatest flexibility. The three may be easily interchanged. The horseshoe having adjustable flexibility 100 allows control over the degree to which a horse's hoof splays on impact, and other factors. A plurality of anti-splay flanges 700 allow control over the degree to which the hoof is allowed to splay or flex outwardly, by adjusting the rigidity of the connection to the horse's hoof. An elastic cross-member 800 may be attached between the rear end portions of the left and right body portions. The elastic cross-member adds to the rigidity and adjustability of the horseshoe, and due to its flexibility tends to damp any vibration.

7 Claims, 5 Drawing Sheets

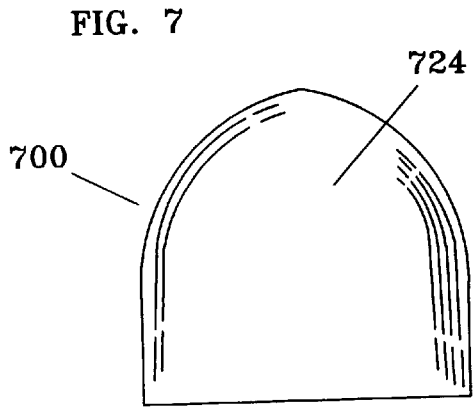
FIG. 7
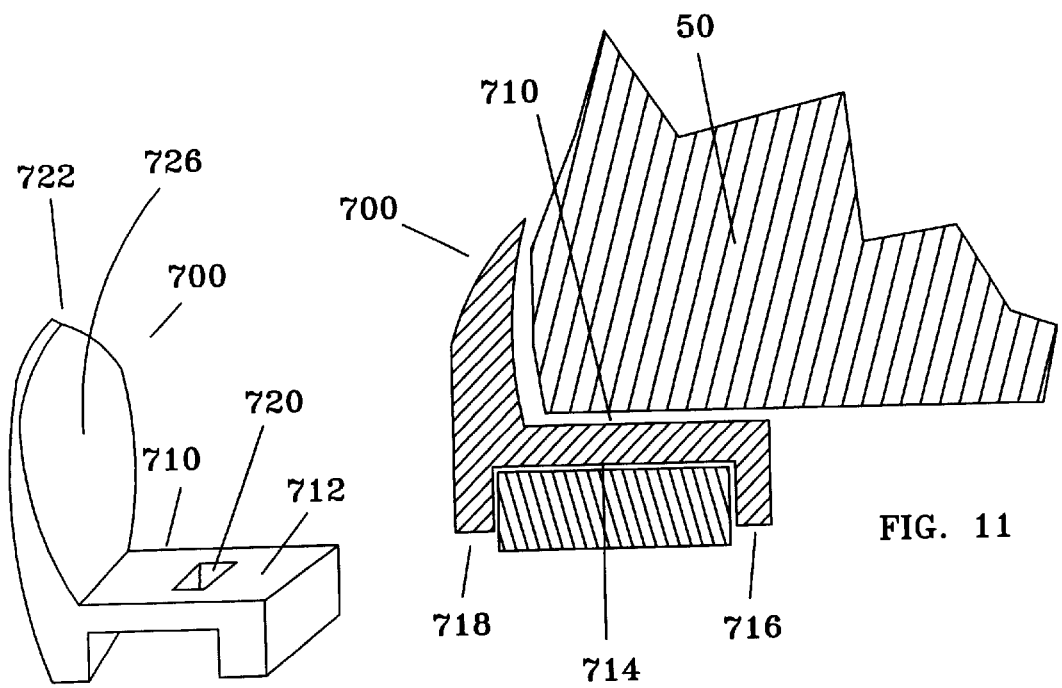
FIG. 11
FIG. 8
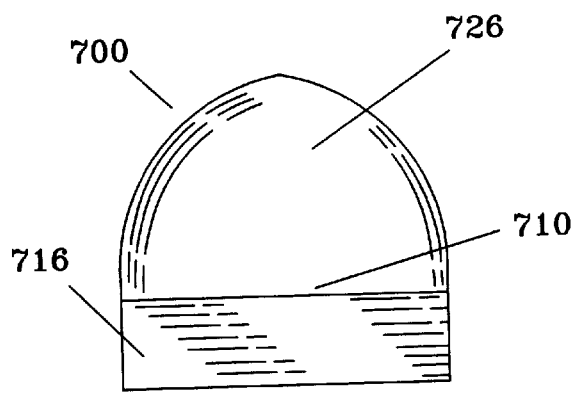
FIG. 9
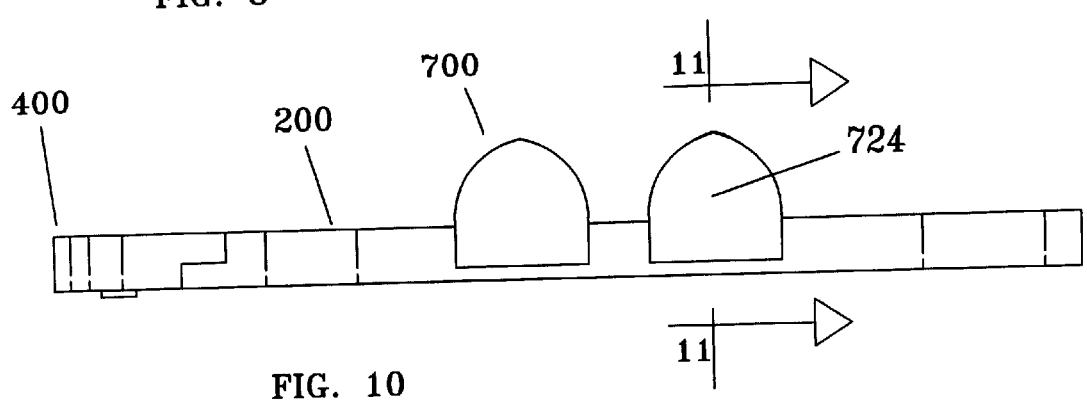
FIG. 10

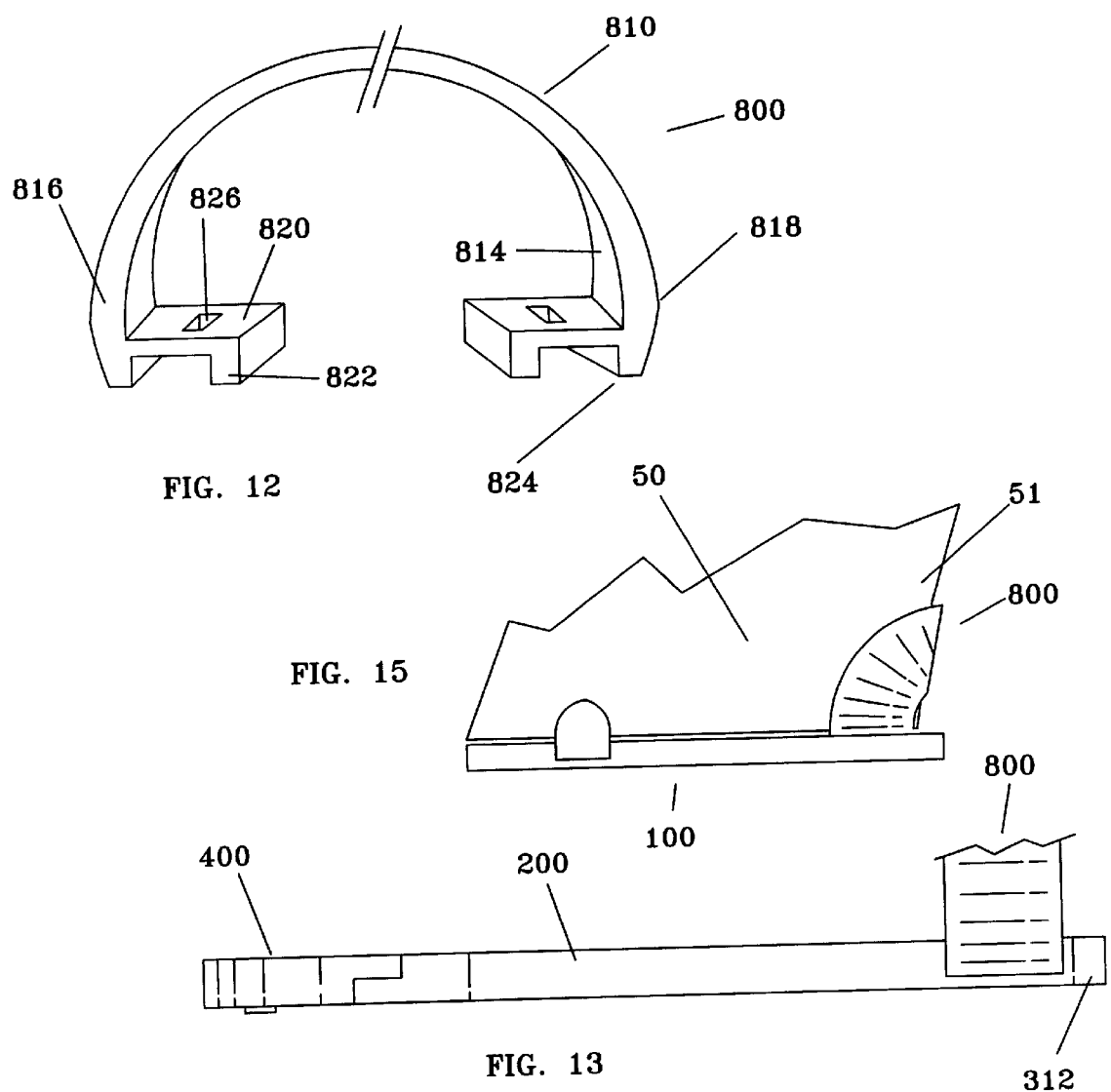

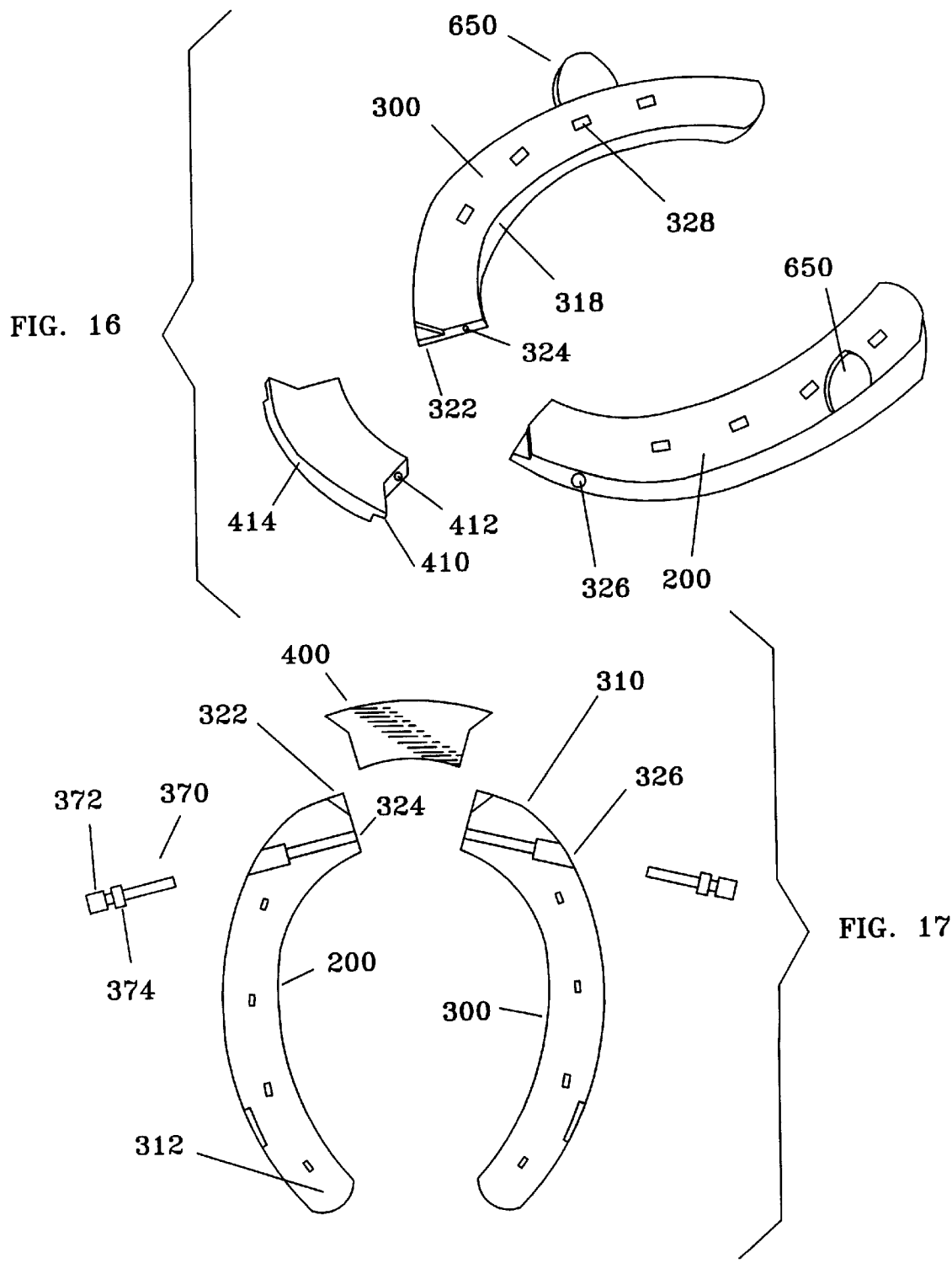

HORSESHOE HAVING ADJUSTABLE FLEXIBILITY

CROSS-REFERENCES

There are no applications related to this application filed in this or any foreign country.

BACKGROUND

It is known that the flexibility of a horseshoe has a significant effect on the hoof of the horse. In general, a stiffer horseshoe may be advantageous for work or racing, but a softer, more flexible shoe is typically healthier for the hoof when engaged in less strenuous activities.

Previous horseshoes have attempted to provide both flexibility and protection to the horse's hoof. Such shoes have had notches or weak spots in the horseshoe to increase the flexibility of the shoe.

Alternatively, other prior horseshoes have substituted different materials, such as rubber, to obtain a more flexible horseshoe.

Unfortunately, while different horseshoes have been designed for different purposes and for the weights of different horses, no one horseshoe has been designed that adequately addresses the needs of any given horse, particularly where that horse is involved in different activities and on different surfaces.

What is needed is a horseshoe having structures which allow a horse owner to easily modify the flexibility of the horseshoe without the aid of a horseshoe professional.

SUMMARY

The present invention is directed to an apparatus that satisfies the above needs. A novel horseshoe having adjustable flexibility provides some or all of the following structures.

(A) A body is formed of left and right body portions, which are attachable to the horse's hoof in the conventional manner, by the use of nails, typically by a horse shoeing professional. In a preferred embodiment, each body portion defines a plurality of recesses, wherein each recess is adapted for carrying an anti-splay flange or one end of an elastic cross-member.

(B) A center piece is releasably connected at left and right ends to the forward ends of the left and right body portions, typically by threaded fasteners. A horse owner may easily release and attach the fasteners, and thereby interchange a variety of center pieces. In a preferred version of the invention, at least two center pieces are provided, a rigid center piece and a flexible center piece. The rigid center piece is typically used when little flexibility or weight variance in the horseshoe is desired, such as when the shoe is being installed on the horse. The flexible center piece is typically notched to result in greater flexibility. Such a horseshoe is typically used in casual and recreational settings, on softer surfaces and other circumstances where a horseshoe having greater flexibility is desired.

(C) One or more anti-splay flanges carried by the recesses defined on each of the left and right body portions, or integrally formed with the body portions, produce a more rigid connection between the horse's hoof and horseshoe. As a result, the horseshoe is better able to reduce hoof splay by resisting outwardly directed forces.

(D) An elastic cross-member, is optionally carried by a recess defined on an upper surface of a rearward end portion of each of the left and right body portions. In use, such an elastic cross-member is pulled back about the rear of the horse's hoof, and cooperates with the anti-splay flanges by more firmly holding the horse's hoof to the horseshoe.

It is therefore a primary advantage of the present invention to provide a novel horseshoe having the characteristic that the flexibility is adjustable by the horse owner, without the need to re-shoe the horse or enlist the services of a horseshoeing professional.

Another advantage of the present invention is to provide a novel horseshoe having a removable elastic cross-member.

Another advantage of the present invention is to provide a novel horseshoe including a kit of parts providing several different center pieces associated with each horseshoe, each center piece having different degrees of flexibility, suitable for different conditions, activities and objectives.

A still further advantage of the present invention is to provide a novel horseshoe having a body comprising left and right halves, each half defining a plurality of recesses adapted to support removable anti-splay flanges. The anti-splay flanges prevent hoof splay, and result in better support for the horse's hoof.

DRAWINGS

These and other features, aspects, and advantages of the present invention will become better understood with regard to the following description, appended claims, and accompanying drawings where:

FIG. 7 is a perspective view of an anti-splay flange, suitable for mounting on a recess of the left and right body portions of the horseshoe of FIG. 1.

FIG. 8 is a outside isometric view of the anti-splay flange of FIG. 7.

FIG. 9 is an inside (from the center of the horseshoe) isometric view of the anti-splay flange of FIG. 7.

FIG. 10 is a side isometric view of a horseshoe having two anti-splay flanges installed.

FIG. 11 is a cross-sectional view of the horseshoe, anti-splay flange and a horse's hoof of FIG. 10, taken along the 11—11 lines.

FIG. 12 is a perspective view of a version of the elastic cross-member of the invention.

FIG. 13 is a side isometric view of a horseshoe with the elastic cross-member installed.

FIG. 14 is a top isometric view of the horseshoe and elastic cross-member of FIG. 13.

FIG. 15 is a side isometric view of the horseshoe of FIGS. 13 and 14 being worn by a horse, and showing a portion of a horse's hoof.

FIG. 16 is an exploded perspective view of a version of the invention having the anti-splay flanges integrally formed with the left and right body portions, and having recesses for the anti-splay flanges removed.

FIG. 17 is an exploded orthographic view of the horseshoe of FIG. 16, showing the fasteners used to attach the center piece.

DESCRIPTION

Figure 1:
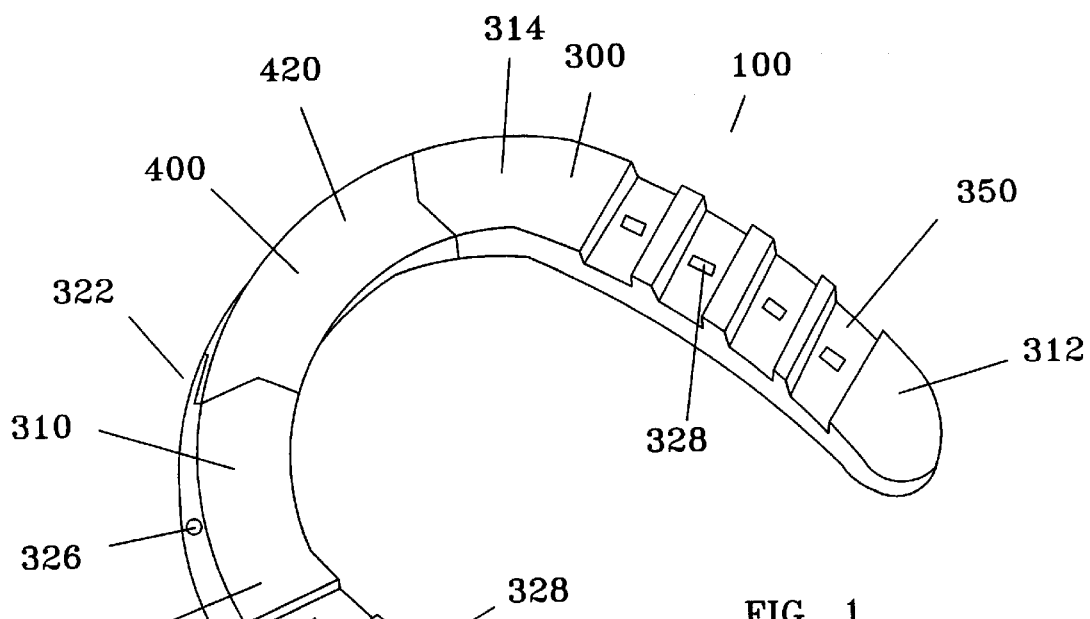
FIG. 1 is a perspective view of the hoof (upper) side of a version of the horseshoe of the invention, showing the rigid center piece installed.

Referring in generally to FIGS. 1 through 15, an example of a horseshoe 100 having adjustable flexibility constructed in accordance with the principles of the invention is seen. The horseshoe provides a body formed of left and right body portions 200, 300. In a preferred embodiment, forward ends of the body portions are connected by one of three or more alternative center pieces, each resulting in greater or lesser flexibility of the overall horseshoe. A rigid center piece 400 provides very little flexibility; a composite center piece 500 provides a greater degree of flexibility; and a flexible center piece 600 provides the greatest flexibility. The three may be easily interchanged. The horseshoe 100 having adjustable flexibility allows control over the degree to which a horse's hoof 50 splays on impact, and other factors. A plurality of anti-splay flanges 700 allow control over the degree to which the hoof is allowed to splay or flex outwardly, by adjusting the rigidity of the connection to the horse's hoof. An elastic cross-member 800 may be attached between the rear end portions of the left and right body portions. The elastic cross-member similarly allows the connection between horse's hoof and horseshoe to be made stronger, and cooperates with the anti-splay flanges by urging the hoof into the flanges. Additionally, the elastic cross-member tends to damp vibration and restrict the amounts of expansion.

Figure 2:
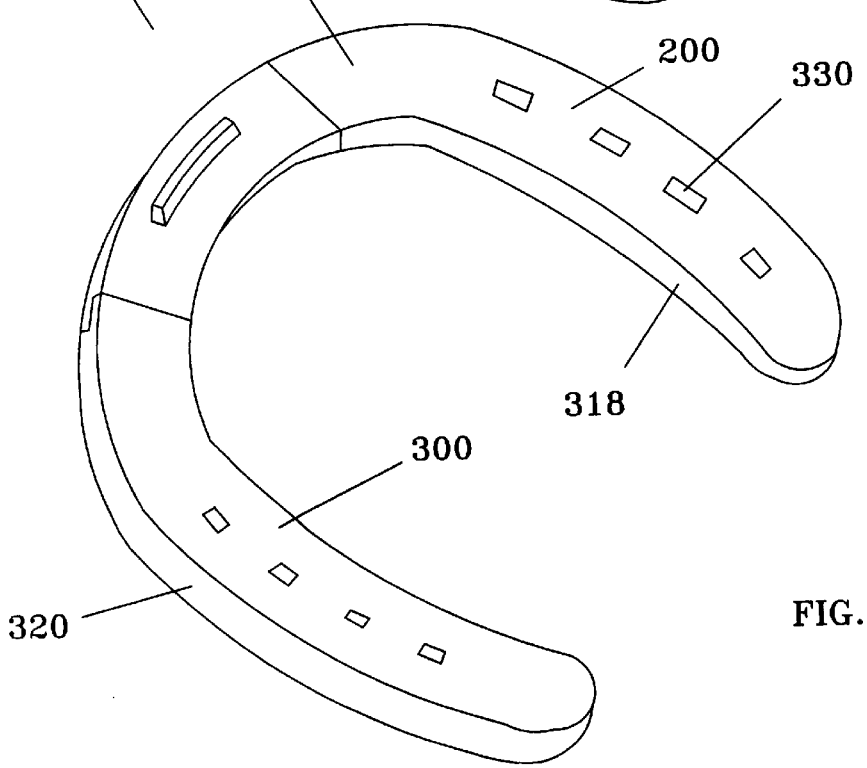
FIG. 2 is a perspective view of the horseshoe of FIG. 1, showing the ground (lower) side.

Referring to FIGS. 1 and 2, the body of the horseshoe is formed of mirror image left and right body portions 200, 300. Depending on the needs of the horse and rider, the left and right portions are connected by either the rigid center piece 400, a composite center piece 500 or a flexible center piece 600.

Each body portion includes a forward end 310 and a rearward end 312. The forward end defines at least one fastening hole 324 having an enlarged opening 326 which aligns with a similar fastener hole 412 defined in the center piece. The fastening hole is typically threaded to allow insertion of a threaded fastener 370. The fastener may be adapted for driving with any suitable tool, such as a slotted head or Phillips head screwdriver, or by a nut driver or wrench.

The forward ends also typically provide a flange 322 mates with a flange 410 carried by the center piece. As seen in the figures, a rabbet-type joint allows a connection between the body portions 200, 300 to be made with a center piece 400, 500 or 600 without making the horseshoe thicker in that area.

Each body portion 200, 300 defines a number of nail holes 328 extending between the upper hoof surface 314 and the lower ground surface 316, in a manner similar to known horseshoes, which are adapted for use in nailing the horseshoe onto a horse's hoof.

As seen in FIG. 1, a plurality of recesses 350 are formed in the upper hoof surface 314. The recesses are sized to support anti-splay flanges 700 and the base 820 of the elastic cross-member 800. The recesses prevent the anti-splay flanges and elastic cross-member from moving. In a preferred version of the invention, four recesses are provided in each body portion. However, in alternate embodiments a different number of recesses could be provided.

A typical center piece, such as the preferred center pieces 400, 500 and 600 seen in FIGS. 1 through 6, attaches at opposed left and right ends 416, 418 to the left and right body portions 200, 300, respectively. The rigidity of the center piece selected determines the flexibility of the horseshoe. Selection of the center piece therefore allows control over the flexibility of the horseshoe, and also over the degree to which the horse's hoof splays or expands.

The typical center piece provides a left and right flanges 410 which overlap the flanges 322 of the left and right body portions 200, 300. In a preferred version of the invention, the flanges 410 carried by the center pieces are adjacent to the upper hoof surface 420, but may be adjacent to the lower ground surface 422 of the center piece.

Figure 3:
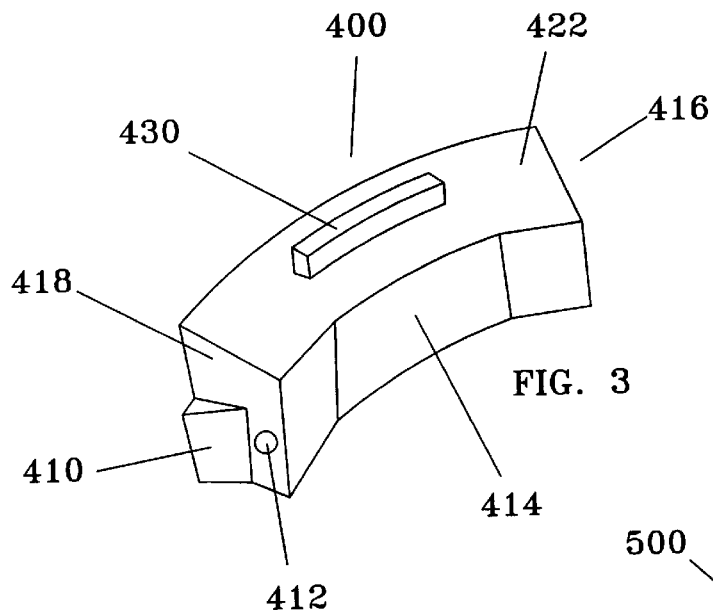
FIG. 3 is a somewhat diagrammatic perspective view of a version of the rigid center piece seen installed in the horseshoe of FIGS. 1 and 2.
Figure 4:
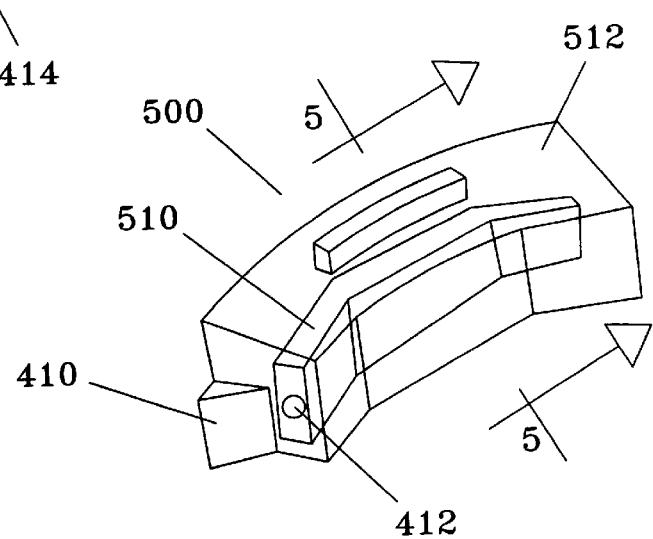
FIG. 4 is a somewhat diagrammatic a perspective view of a version of the composite center piece, having a rigid internal frame encapsulated in a shell made of polymer plastic or similar material.
Figure 6:
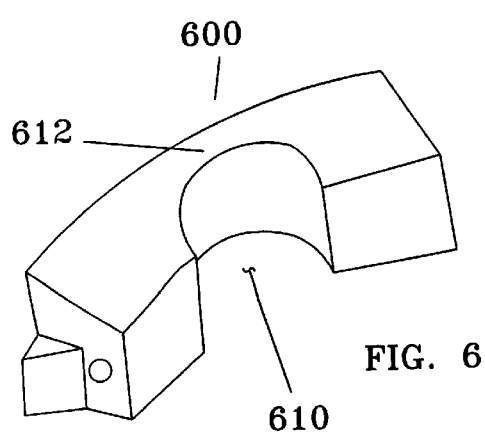
FIG. 6 is a somewhat diagrammatic a perspective view of a flexible center piece having a body defining a notch which results in greater flexibility.

Fastener holes 412, seen in FIGS. 3, 4 and 6, are defined in the left and right ends 416, 418 of the center pieces 400, 500, 600. The fastener holes 412 are typically threaded, and allow connection of a center piece to the left and right body portions.

The body 414 of the typical center piece is gently arcuate, and is made of a material that is calculated to result in the desired rigidity. The desired rigidity is typically a function of the horse's activity, weight, the nature of the ground surface and other factors.

An optional feature of any of the center pieces includes the application of a textured surface or tread to the lower surface. This provides the horse with more tractional footing on many surfaces. As an example, a cleat 430 is seen in FIG. 3 on the lower surface of a rigid center piece.

A rigid center piece 400 is seen in FIGS. 1, 2 and 3. Use of the rigid center piece tends to result in a rigid horseshoe. Such a horseshoe is typically used when the horseshoe is being attached to the horse's hoof or for shorter periods of intense exercise. When the horseshoe is being attached, little flexibility is desired, since it is advantageous to attach the horseshoe when it is not being flexed. The rigid center piece is typically made of a solid piece of steel. However, it can be made of alternative materials such as ultra high molecular weight polyethylene, as required for a particular horse, ground surface and activity.

Figure 5:
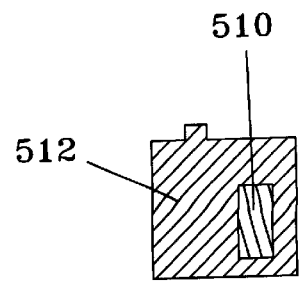
FIG. 5 is a somewhat diagrammatic a cross-sectional view of the composite center piece of FIG. 4, showing the frame encapsulated within the shell.

A composite center piece 500 is seen in FIGS. 4 and 5. Such a center piece is typically somewhat less rigid than the solid center piece seen in FIGS. 1–3. As seen in FIGS. 4 and 5, a composite center piece typically provides a frame 510 that is made or a rigid material, such as hardened steel. A protective shell 512 encapsulates the frame, and is typically made of rigid plastic. The threaded fastener holes 412 are typically defined at least in part in the frame, which provides better protection against thread-stripping.

A notched or grooved center piece 600 is seen in FIG. 6. The notched center piece results in a more flexible horseshoe than the rigid center piece 400 and the composite center piece 500, and is typically used when the horse is occupied with less strenuous activities than with more rigid center pieces.

The notch or groove 610 results in a bridge 612 having greater flexibility than the rigid center piece 400. The relative sizes of the notch and bridge should be selected after evaluating the weight of the horse, the desired flexibility of the horseshoe and the material used in the construction of the notched center piece. However, the bridge 612 is typically about the same size as the notch 610; as a result, the notched center piece is much more flexible than the rigid center piece.

The notch may be made in any desired configuration, and the notch seen in FIG. 6 is intended to be representative of one of many possible notches.

Left and right fasteners attach the left and right body portions 200, 300 to the left and right sides of the center piece. In a preferred embodiment, a threaded fastener 370 is used. The fastener may be a bolt or screw, such as a 8–32 UNC-2A or 10–24 UNC-2A. The head 372 of the fastener is typically driven by a wrench of some type, including any known type such as an Allen wrench.

As seen in FIG. 17, an o-ring or washer 374 may be used to provide strain relief and absorb shock. The o-ring is typically made of rubber or plastic having some resiliency. As a result, when splaying forces tend to force the end 312 of the horseshoe apart, the o-ring absorbs some of the shock and strain.

The degree of rigidity with which the horse's hoof is attached to the horseshoe is also important to control the degree to which a horse's hoof splays or expands on impact. With a rigid connection between the hoof and the shoe, there is less resulting splay in the hoof given a horseshoe of any given rigidity. As a result, it is important to control the rigidity of the connection between the hoof and shoe. The anti-splay flanges grasp the hoof, and therefore tend to require the horseshoe to flex if the horse's hoof is going to splay on impact. As a result, there is less hoof splay on impact. The anti-splay flanges therefore tend to effect the degree to which stress is applied to the horseshoe, and therefore the degree to which the horseshoe is flexed.

Adjustable anti-splay flanges 700 may be attached to the left and right body portions 200, 300 to limit the radially outward travel of portions of the hoof. As seen in FIGS. 7, 8 and 9, each anti-splay flange 700 provides a base 710 having an upper and a lower surface 712, 714. Inner and outer feet 716, 718 depend from the lower surface. As seen in FIG. 11, the space between the feet is incrementally greater than the distance between the inside and outside edge surfaces 318, 320; i.e. the width of the hoof surface 314 of the left and right body portions. As a result, the feet 716, 718 tend to straddle the upper surface 314 of the horseshoe. Similarly, the base 710 is carried between within a recess 350 on the upper surface. A nail hole 720 is defined in a middle portion of the base, which allows the anti-splay device to be nailed into place between the upper portion of the body portion and the bottom of the horse's hoof, as seen in the cross-sectional view of FIG. 11.

A wall 722 having an inner concave surface 726 and an outer convex surface 724 is directed upwardly after installation on the horse, as seen in FIGS. 10 and 11. The wall 722 prevents radially outward movement of the horse's hoof 50 on impact, and increases the rigidity of the connection between the horse's hoof and the horseshoe.

As is best seen in FIG. 16, a version of the invention provides an integral an anti-splay flange 650 is carried by each the left and right body portions. Horse's hoofs tend to splay or spread outwardly upon impact due to the horse's weight and the weight of a rider or other load. The integral anti-splay flange restricts the horse's hoof from splaying outwardly by restraining the perimeter of the hoof. Due to the anti-splay flange, any splaying or spreading outward of the horses hoof will cause the horse shoe to flex. Control over the flexibility of the horseshoe therefore controls the degree to which the horse's hoof may splay.

The anti-splay flange 650 is carried by the hoof surface 314, adjacent to the outside edge surface 320 in a rearward portion 312 of each body portion 200, 300. While the preferred location for such an integral anti-splay flange is toward the rear of the shoe, other locations are possible.

The flexibility of the horse shoe may be further adjusted by use of the elastic cross-member 800 seen in FIGS. 12 through 15. The elastic cross-member stretches behind the horse's hoof, as seen in FIG. 15, and tends to urge the foot forwardly, against the anti-splay flanges. In this manner the elastic cross-member 800 and anti-splay flanges tend to cooperate to more firmly hold the horse's hoof in place, as seen in FIG. 15. This results in better control over the degree to which the horse's hoof splays based on control over the rigidity of the horseshoe and control over the rigidity of the connection between the hoof and the horseshoe. The elastic cross-member can be made out of a variety of materials, including resilient plastics or rubber.

Referring to FIGS. 12 through 15, the elastic cross-member 800 provides a strap 810 anchored by left and right bases 820. The elastic strap has upper and lower surfaces 812, 814. As seen in FIG. 15, the lower surface 814 contacts the back 51 of the horse's hoof when the elastic cross-member is installed.

The bases 820 are carried by first and second ends 816, 818 of the elastic strap 810. Each base is installed on a recess 350 defined in the left and right body portions 200, 300. Typically the rear-most recess is used. The bases 820 are sized similarly to the base 710 of the anti-splay flanges 700, and provide inner and outer feet 822, 824 which are spaced to straddle the width of a body portion 200 or 300. A nail hole 826 is defined in the base 820 and allows the base to be connected to a body portion by a nail or other fastening means in a manner similar to the flanges 700.

An inelastic member may be carried by the elastic cross-member to limit the extent to which the elastic cross-member expands.

To facilitate the need of horse owners to adjust the flexibility of the horseshoe frequently, to address differing conditions faced by the horse, it is an important aspect of the present invention to provide a number of interchangeable center pieces, as well as a number of anti-splay flanges and elastic cross-members. As a result, one aspect of the invention is to provide a kit of parts having an assortment of elements consistent with the above description, that will enable a horse owner to easily and quickly alter the flexibility of the horseshoes, while still on the horse by substitution of the center piece.

A kit of parts consistent with the preferred version of the invention includes the following for each horseshoe having adjustable flexibility 100: a body having left and right body portions 200, 300; a rigid center piece 400; a composite center piece 500; a flexible center piece 600; at least two anti-splay flanges 700 and an elastic cross-member 800. In a preferred embodiment of the kit, the threaded fasteners 370 required to attach the center pieces to the left and right body halves would also be included. Additionally, the kit may optionally provide the nails used to attach the shoe to the horse's hoof. It is clear that the horse owner would typically require four such kits for each horse. A kit of parts may also include additional anti-splay flanges 700 and additional elastic cross-members 800, since these part may tend to get lost or wear out.

A reduced kit of parts would include only the body portions and two center pieces. An intermediate kit of parts would include additional parts, including some subset of the preferred kit of parts.

To use a preferred version of the invention, the horseshoe 100 is first assembled, and then installed on the horse's hoof. The body is assembled by attaching left and right halves 200, 300 to the left and right ends 416, 418, respectively, of a rigid center piece 400. The rigid center piece is used when the horseshoe is installed, so that no twisting of the shoe will be present when it is installed. The fastening holes 324 of the halves 200, 300 are aligned with the fastening holes 412 of the left and right ends of the rigid center piece 400. Fasteners 370 are then threaded into place, causing a rigid connection between the three components. One or more anti-splay flanges 700 may be installed, as seen in FIG. 10, 11 and 15. An elastic cross-member 800 may also be installed, as seen in FIGS. 13 and 14, and then pulled back about the rear 51 of the horse's hoof 50, as seen in FIG. 15. The horseshoe is then nailed onto the horse's hoof, using standard nails and holes 328 defined in the left and right body portions.

At a later time, the owner of the horse may want to change the flexibility of the horseshoe. The rigid center piece may be removed by removal of the fasteners 370. With the fasteners removed, the rigid center piece 400 is removed, and either the composite center piece 500 or the flexible center piece 600 may be installed.

The previously described versions of the present invention have many advantages, including a primary advantage of providing a novel horseshoe having the characteristic that the flexibility is adjustable by the horse owner, without the need to re-shoe the horse or enlist the services of a horseshoeing professional.

Another advantage of the present invention is to provide a novel horseshoe having a removable elastic cross-member.

Another advantage of the present invention is to provide a novel horseshoe including a kit of parts providing several different center pieces associated with each horseshoe, each center piece having different degrees of flexibility, suitable for different conditions, activities and objectives.

A still further advantage of the present invention is to provide a novel horseshoe having a body comprising left and right halves, each half defining a plurality of indentations adapted to support removable anti-splay flanges. The anti-splay flanges prevent hoof splay, and result in better support for the horse's hoof.

Although the present invention has been described in considerable detail and with reference to certain preferred versions, other versions are possible. For example, while the various elements of the invention, including the various interchangeable center pieces, anti-splay flanges and elastic cross-members cooperate to provide increased control to the horse owner over the flexibility of the horseshoe, the use of each and every element described is not necessary, to achieve desirable results, but is only necessary to achieve the preferred result. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A horseshoe comprising:
   (A) a body comprising left and right body portions, each body portion having a forward end defining at least one fastening hole and defining flanges extending from the forward end of each of the left and right body portions;
   (B) a center piece comprising a frame made of a rigid material encapsulated within a shell, the center piece having left and right ends, the left and right ends defining left and right fastening holes and defining left and right flanges, the left and right flanges sized to mate with the flanges on the left and right body portions, respectively; and
   (C) left and right releasable fastening means, carried by the left and right fastening holes, for attaching the left and right ends of the center piece to the left and right body portions, respectively.

2. The horseshoe of claim 1, further comprising at least one anti-splay flange carried by each of the left and right body portions, each of the at least one anti-splay flanges comprising a generally perpendicular base and wall, wherein an inner and an outer foot extend from a lower surface of the base, and wherein the space between the inner and outer feet is incrementally greater than the distance between an inside and an outside edge surface of the left and right body portions, the base also defining a hole carried in alignment with a similarly sized hole defined in each of the left and right body portions.

3. The horseshoe of claim 1, further comprising an elastic cross-member having first and second ends carried by the left and right body portions, and adapted to be pulled back about a rear portion of a horse's hoof, each of the first and second ends supported by a base, each base having an inner and an outer foot extending from a lower surface of the base, and wherein the space between the inner and outer feet is incrementally greater than the distance between an inside and an outside edge surface of the left and right body portions, the base also defining a hole carried in alignment with a similarly sized hole defined in each of the left and right body portions.

4. A horseshoe comprising:
   (A) a body comprising left and right body portions, each body portion having a forward end defining at least one fastening hole;
   (B) a center piece having left and right ends, the left and right ends defining left and right fastening holes;
   (C) left and right releasable fastening means, carried by center piece, for attaching the left and right ends of the center piece to the left and right body portions, respectively;
   (D) at least one anti-splay flange carried by each of the left and right body portions, each of the at least one anti-splay flanges comprising a generally perpendicular base and wall, wherein an inner and an outer foot extend from a lower surface of the base, and wherein the space between the inner and outer feet is incrementally greater than the distance between an inside and an outside edge surface of the left and right body portions, the base also defining a hole carried in alignment with a similarly sized hole defined in each of the left and right body portions; and
   (E) an elastic cross-member, having first and second ends carried by a recess on a rearward end portion of each of the left and right body portions, and adapted to be pulled back about a rear portion of a horse's hoof, each of the first and second ends supported by a base, each base having an inner and an outer foot extending from a lower surface of the base, and wherein the space between the inner and outer feet is incrementally greater than the distance between an inside and an outside edge surface of the left and right body portions, the base also defining a hole carried in alignment with a similarly sized hole defined in each of the left and right body portions.

5. A kit of parts for assembling a horseshoe having adjustable flexibility, comprising:

(A) a body comprising left and right body portions;

(B) a rigid center piece;

(C) a flexible center piece; and (D) at least two anti-splay flanges, each of the at least two anti-splay flanges comprising a generally perpendicular base and wall, wherein an inner and an outer foot extend from a lower surface of the base, and wherein the space between the inner and outer feet is incrementally greater than the distance between an inside and an outside edge surface of the left and right body portions, the base also defining a hole carried in alignment with a similarly sized hole defined in each of the left and right body portions.

6. The kit of parts of claim 5, additionally comprising:

(A) a composite center piece comprising a frame made of a rigid material encapsulated within a shell.

7. The kit of parts of claim 5, additionally comprising:

(A) an elastic cross-member having first and second ends carried by an recess on a rearward end portion of each of the left and right body portions, and adapted to be pulled back about a rear portion of a horse's hoof each of the first and second ends supported by a base, each base having an inner and an outer foot extending from a lower surface of the base, and wherein the space between the inner and outer feet is incrementally greater than the distance between an inside and an outside edge surface of the left and right body portions, the base also defining a hole carried in alignment with a similarly sized hole defined in each of the left and right body portions.

* * * * *